United States Patent
Imagawa et al.

(10) Patent No.: US 12,503,794 B2
(45) Date of Patent: Dec. 23, 2025

(54) SEA-ISLAND COMPOSITE FIBER

(71) Applicant: KURARAY CO., LTD., Kurashiki (JP)

(72) Inventors: Kaori Imagawa, Kurashiki (JP); Satoshi Koizumi, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 680 days.

(21) Appl. No.: 17/840,688

(22) Filed: Jun. 15, 2022

(65) Prior Publication Data

US 2022/0307161 A1 Sep. 29, 2022

Related U.S. Application Data

(63) Continuation of application No. PCT/JP2020/047036, filed on Dec. 16, 2020.

(30) Foreign Application Priority Data

Dec. 17, 2019 (JP) .................... 2019-226988

(51) Int. Cl.
*D01F 8/14* (2006.01)
*D01D 5/34* (2006.01)
(Continued)

(52) U.S. Cl.
CPC ............... *D01F 8/14* (2013.01); *D01D 5/34* (2013.01); *D01D 5/36* (2013.01); *D01F 8/06* (2013.01)

(58) Field of Classification Search
CPC ......... Y10T 428/2976; Y10T 428/2931; D01F 8/14; D01F 8/06; D01D 5/34; D01D 5/36; D01D 5/253; C08L 29/04; C08L 23/06; C08L 23/00; C08L 23/08; C08J 2323/06; C08J 2429/04; C08J 3/005
See application file for complete search history.

(56) References Cited

U.S. PATENT DOCUMENTS

| | | | | |
|---|---|---|---|---|
| 5,486,418 A | * | 1/1996 | Ohmory | D04H 1/54 428/397 |
| 2006/0263601 A1 | * | 11/2006 | Wang | D01F 8/12 428/373 |
| 2007/0196649 A1 | * | 8/2007 | Kamiyama | D01F 8/14 442/363 |

FOREIGN PATENT DOCUMENTS

CN 101313091 A 11/2008
CN 104342780 A 2/2015
(Continued)

OTHER PUBLICATIONS

English translation of the International Preliminary Report on Patentability and Written Opinion issued Jun. 30, 2022 in PCT/JP2020/047036, 5 pages.

(Continued)

*Primary Examiner* — Elizabeth M Imani
(74) *Attorney, Agent, or Firm* — Element IP, PLC

(57) ABSTRACT

Provided is a sea-island composite fiber having excellent spinnability and thermoplastic deformability. The sea-island composite fiber comprises an island component and a sea component having a lower melting point than that of the island component, wherein the fiber has an aspect ratio of from 2.0 to 5.0 in a fiber cross section; and the sea component has a sea component thickness of from 0.2 to 2.0 μm, the sea component thickness being defined as a distance between an outer periphery of the fiber and an island component closest to the outer periphery on a minor axis of the fiber cross section.

11 Claims, 1 Drawing Sheet

(51) Int. Cl.
  *D01D 5/36*   (2006.01)
  *D01F 8/06*   (2006.01)

(56) References Cited

FOREIGN PATENT DOCUMENTS

| | | |
|---|---|---|
| JP | S60-59121 A | 4/1985 |
| JP | 2000282333 A | 10/2000 |
| JP | 2006249233 A | 9/2006 |
| JP | 2009061718 A | 3/2009 |
| JP | 2014185265 A | 10/2014 |
| JP | 2015148032 A | 8/2015 |
| JP | 2016030879 A | 3/2016 |
| JP | 2016175209 A | 10/2016 |
| WO | WO-2008112173 A1 | 9/2008 |

OTHER PUBLICATIONS

Extended European Search Report issued Sep. 23, 2024 in corresponding European Patent Application No. 20900908.3, 9 pages.
International Search Report issued Feb. 16, 2021 in PCT/JP2020/047036 (with English translation), 4 pages.
"Coefficient of variation", Wikipedia The Free Encyclopedia, https://en.wikipedia.org/wiki/Coefficient_of_variation, Apr. 3, 2025, 10 pages.

\* cited by examiner

SEA-ISLAND COMPOSITE FIBER

CROSS REFERENCE TO THE RELATED APPLICATION

This application is a continuation application, under 35 U.S.C. § 111(a), of international application No. PCT/JP2020/047036 filed Dec. 16, 2020, which claims priority to Japanese patent application No. 2019-226988, filed Dec. 17, 2019, the entire disclosures of all of which are herein incorporated by reference as a part of this application.

FIELD OF THE INVENTION

The present invention relates to a flat sea-island composite fiber suitable for incorporation in a matrix material (for example, a thermoplastic resin molded body) and use of such fibers, as well as a thermoplastic resin molded body comprising such sea-island composite fibers and a production method therefor.

BACKGROUND OF THE INVENTION

A fiber-containing resin molded body containing, for example, a thermoplastic resin as a matrix material has, in addition to characteristics of the resin, advantages derived from the contained fibers, such as high tenacity, heat insulating property, lightweight, weather resistance, and electrical insulating property. The fiber-containing resin molded bodies are applicable in various fields such as building materials, automobile components, medical devices, and shock absorbers.

For example, Patent Document 1 (JP Laid-open Patent Publication No. 2014-185265) discloses a method of generating bubbles by a technique of dispersing a water-absorbing medium in a resin to form water bubbles. Patent Document 1 describes that with water introduced to sea-island composite fibers containing a water can be mixed with a thermoplastic resin and then be subjected to heating, so that bubbles can be formed as the water evaporates during molding to give a molded body containing fine bubbles.

PATENT DOCUMENT

[Patent Document 1] JP Laid-open Patent Publication No. 2014-185265

SUMMARY OF THE INVENTION

In the method described in Patent Document 1, the composite fibers having island component are uniformly dispersed in the thermoplastic resin. In addition, since the sea component has a lower melting point than the island component, the sea component melting faster than the island components upon heating enables the island components to be dispersed. This makes it possible to obtain a thermoplastic resin molded body in which the fine bubbles are uniformly dispersed.

In such a method for dispersing the sea-island composite fibers, however, the sea-island composite fibers are heated only through the thermoplastic resin upon heat application, so that the sea-island composite fibers in contact with the thermoplastic resin cannot be sufficiently heated, resulting in uneven heat dissipation to the sea-island composite fibers and insufficient thermoplastic deformation of the sea-island composite fibers. The sea-island composite fiber with insufficient thermoplastic deformation inevitably has the sea component with insufficient thermoplastic deformation, so that movement of the island component inside the composite fiber is restricted by the sea component. Where the island component is restricted by the sea component, the respective island parts in the island component cannot move independently, resulting in uneven distribution of the island parts in the thermoplastic resin. In such a case, the characteristics of the fibers such as improved tenacity may not be exhibited in a thermoplastic resin molded body.

As a result of intensive studies conducted by the inventors of the present invention to solve the problem, the inventors found that the specific sea-island composite fibers to be dispersed in a matrix material enable to have improved heat dissipation by making a cross section of each sea-island composite fiber in a predetermined aspect ratio, and thereby the sea component can have improved thermoplastic deformability when the matrix material is heated to disperse the sea-island composite fibers, so that the sea-island composite fibers allow the respective island parts of the island component to be independently dispersed in the matrix material without restricting the island component. The present inventors thus achieved the present invention.

That is, the present invention may include the following preferred aspects.

Aspect 1

A sea-island composite fiber (preferably, a flat sea-island composite cut fiber) comprising an island component and a sea component having a lower melting point than that of the island component, wherein the fiber has an aspect ratio of from 2.0 to 5.0 (preferably from 2.6 to 3.4) in a fiber cross section; and the sea component has a sea component thickness of from 0.2 to 2.0 μm (preferably from 0.5 to 1.0 μm), the sea component thickness being defined as a distance between an outer periphery of the fiber and an island component closest to the outer periphery on a minor axis of the fiber cross section.

Aspect 2

The sea-island composite fiber according to aspect 1, wherein the island component contains an ethylene-vinyl alcohol copolymer (preferably an ethylene-vinyl alcohol copolymer containing ethylene in a proportion of from 25 to 70 mol %).

Aspect 3

The sea-island composite fiber according to aspect 1 or 2, wherein the sea component contains a polyolefinic resin.

Aspect 4

The sea-island composite fiber according to any one of aspects 1 to 3, wherein the sea-island composite fiber has a single fiber fineness of 50 dtex or lower (preferably 20 dtex or lower, and further preferably 15 dtex or lower).

Aspect 5

The sea-island composite fiber according to any one of aspects 1 to 4, wherein the island component has an aspect ratio of 5.0 or lower (preferably 4.0 or lower, and more preferably 3.5 or lower).

Aspect 6

The sea-island composite fiber according to aspect 5, wherein the aspect ratio of the island component has a CV value of 45% or lower (preferably 35% or lower, and more preferably 25% or lower).

Aspect 7

The sea-island composite fiber according to any one of aspects 1 to 6, wherein the sea-island composite fiber has a fiber length of from 0.5 to 30 mm (preferably from 1.0 to 20 mm, more preferably from 1.5 to 10 mm, and further preferably from 2.7 to 3.3 mm).

Aspect 8

The sea-island composite fiber according to any one of aspects 1 to 7, wherein the sea-island composite fiber comprises an oiling agent applied in a proportion of from 0.1 to 30 wt % (more preferably from 0.1 to 10 wt %, and further preferably from 1.0 to 5.0 wt %) based on a fiber weight.

Aspect 9

The sea-island composite fiber according to any one of aspects 1 to 8, wherein the fiber has a shrinkage property for shrinking by 10% in fiber length in a longitudinal direction of the fiber in 500 seconds or shorter when the fiber is heated at 160° C. with a weight of 0.14 mg/dtex attached to an end of the fiber.

Aspect 10

Use of sea-island composite fibers as recited in any one of aspects 1 to 9 for molding, wherein a matrix material and the sea-island composite fibers are mixed to give a mixture; and the mixture is heated at a temperature equal to or higher than a melting point of the sea component and lower than a melting point of the island component of the sea-island composite fibers.

Aspect 11

A molded body comprising, at least in part of the molded body, sea-island composite fibers as recited in any one of aspects 1 to 9.

Aspect 12

A method of producing a molded body, the method comprising:
mixing a matrix material and sea-island composite fibers as recited in any one of aspects 1 to 9 to give a mixture, and
heating the mixture at a temperature equal to or higher than a melting point of the sea component and lower than a melting point of the island component of the sea-island composite fibers to mold the mixture into shape.

The present invention encompasses any combination of at least two features disclosed in the claims and/or the specification and/or the drawings. In particular, any combination of two or more of the appended claims should be equally construed as included within the scope of the present invention.

Effects of the Invention

According to the present invention, a flat sea-island composite fiber having excellent spinnability and thermoplastic deformability can be obtained. Use of such flat sea-island composite fibers for producing a molded body makes it possible to independently disperse the island component without being restricted by the sea component in a mixture of the fibers and a matrix material so as to provide a molded body in which uneven distribution of the island component is suppressed.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views. The drawings are not necessarily shown at a consistent scale and are exaggerated in order to illustrate the principle of the present invention. In the figures.

DESCRIPTION OF THE EMBODIMENTS

Figure 1:
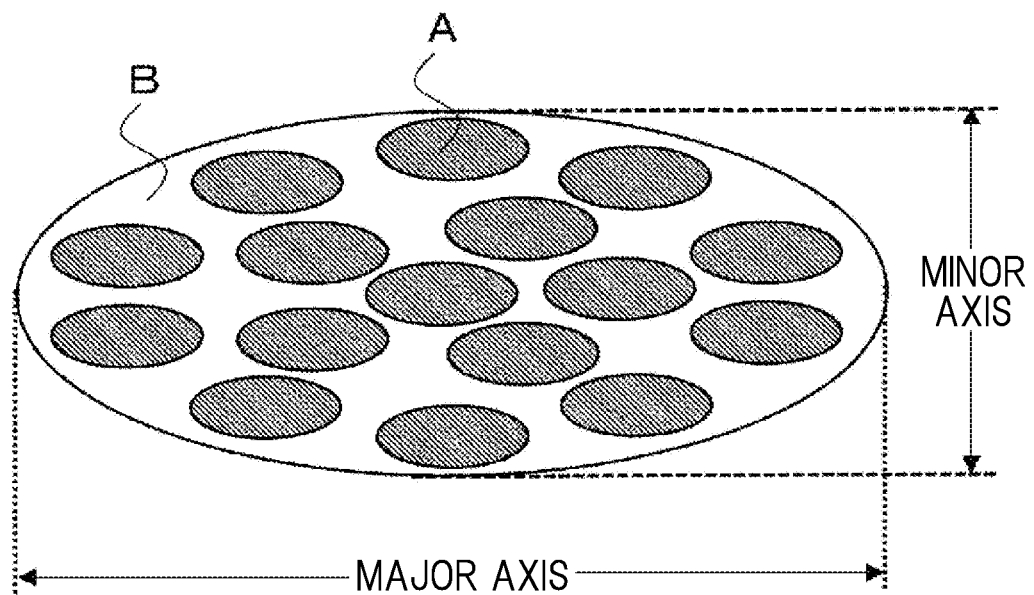
FIG. 1 is an exemplary schematic cross-sectional view of a flat sea-island composite fiber used in the present invention, the fiber being cut orthogonal to a longitudinal direction (i.e., a fiber axis direction) of the fiber.

Hereinafter, embodiments of the present invention will be described in detail.

Flat Sea-Island Composite Fiber

A flat sea-island composite fiber according to the present invention comprises an island component and a sea component having a lower melting point than that of the island component. Such a flat sea-island composite fiber can be cut to an arbitrary fiber length to obtain a flat sea-island composite cut fiber.

Island Component

A polymer used as the island component constituting the flat sea-island composite fiber is not limited to a specific one as long as it is a thermoplastic polymer. Various fiber-forming thermoplastic polymers can be used, and examples of such thermoplastic polymers may include polyamide resins, polyester resins, polyolefinic resins, acrylic resins, and thermoplastic vinyl alcohol resins. Of these, thermoplastic vinyl alcohol resins (especially ethylene-vinyl alcohol copolymers) are preferable in terms of excellent hydrophilicity. For example, where a molded product is required to be hydrophilic for applications such as the inner and outer walls of a building, an ethylene-vinyl alcohol copolymer may be preferably used.

Of these, a more preferable ethylene-vinyl alcohol copolymer (inciting point: 120 to 190° C.) contains 25 to 70 mol % of ethylene (preferably 30 to 60 mol %, and more preferably 35 to 55 mol %). There is a possibility that an ethylene-vinyl alcohol copolymer having an ethylene content below the lower limit may be gelatinized in spinning, resulting in deterioration in spinnability. An ethylene-vinyl alcohol copolymer having an ethylene content above the upper limit, on the other hand, may be unlikely to exhibit hydrophilicity.

The ethylene-vinyl alcohol copolymer may have a saponification degree of, for example, 88% or higher, preferably 95% or higher, and more preferably 98% or higher. The upper limit of the saponification degree is not limited to a specific value and may be, for example, 99.8%.

Sea Component

It is importance that the polymer used as the sea component constituting the flat sea-island composite fiber has a lower melting point than that of the polymer used as the island component. In a process of forming a molded body in which flat sea-island composite fibers are dispersed in a matrix material, the sea component melts faster than the island component, and the sea-island composite fibers have an aspect ratio as defined later of from 2.0 to 5.0 in its fiber cross section, so that heat is sufficiently dissipated to the sea component of the sea-island composite fibers in the matrix. This increases melting property of the sea component so as to reduce a binding force of the sea component to the island component in the sea-island composite fibers, leading to uniform dispersion of the island component in the mixed fluid containing the flat sea-island composite fibers and the matrix material. Such a sea component is not limited to a specific one as long as it has a lower melting point than that of the island component and is capable of forming a sea-island structure in spinning. Examples of the sea component may include polyolefinic resins, acrylic resins, a polyamide resins and the like.

Of these, preferred one may include polyolefinic resins in terms of fiber dispersibility. Examples of the polyolefinic resin may include: various type of polyethylene (low density (LDPE), linear low density (L-LDPE), medium density (MDPE), or high density (HDPE); melting point: 95 to 150° C.); a low-melting-point polypropylene (melting point: 115 to 155° C.); and an ethylene-propylene block copolymer (melting point: 95 to 165° C.).

In terms of improving thermoplastic deformability, the sea component may have a thermal conductivity (unit: $10^{-4}$ cal/sec·cm/° C.·cm) of, for example, 3 or higher, preferably 5 or higher, and more preferably 7 or higher, the thermal conductivity measured in accordance with ASTM C177. The upper limit of the thermal conductivity is not limited to a specific value and may be, for example, 20 or lower.

The melting point (Ms) of the resin constituting the sea component is only required to be lower than the melting point (Mi) of the resin constituting the island component, and the difference (Mi−Ms) between these melting points may be preferably from 20 to 80° C., and more preferably from 30 to 60° C. The difference within a predetermined range makes it possible to improve the dispersibility of the island component while taking advantage of the thermoplastic deformability of the sea component.

In the flat sea-island composite fiber, the island component and the sea component may be preferably present at a composite ratio by weight of (island component)/(sea component)=10/90 to 90/10. There is a possibility that at an unbalanced composite ratio with a content of the island component below the lower limit or above the upper limit, as-spun fibers discharged from a spinning nozzle may feasibly bend, leading to insufficient spinnability. The composite ratio of the island component to the sea component may be more preferably from 30/70 to 90/10, and further preferably from 50/50 to 80/20.

The flat sea-island composite fiber may comprise an oiling agent applied to a fiber surface in spinning in order to improve dispersibility of such fibers in the matrix material of the molded body. The type of oiling agent can be suitably selected depending on the type of matrix material to be mixed with the flat sea-island composite fiber. Examples of the oiling agent may include: an animal oil, a vegetable oil, a synthetic lubricating oil, a mineral oil, a nonionic surfactant, an anionic surfactant, a cationic surfactant, an amphoteric surfactant, and other oiling agents. The oiling agent may be applied at 0.1 to 30 wt %, more preferably 0.1 to 10 wt %, and further preferably 1.0 to 5.0 wt % based on the weight of the fiber.

As long as the effect of the present invention is not impaired, the flat sea-island composite fiber used in the present invention may contain, as needed, inorganic substances such as titanium oxide, silica, and barium oxide; carbon black; colorants such as dyes and pigments; additives such as antioxidants, UV absorbers, and light stabilizers.

It is important that the flat sea-island composite fiber according to the present invention has high thermoplastic deformability. For example, when the fiber is heated at 160° C. with a predetermined weight (for example, 0.14 mg/dtex) attached to an end of the fiber, the fiber may have a shrinkage property for shrinking by 10% in fiber length in a longitudinal direction of the fiber preferably in 500 seconds or shorter. Where the fiber shrinks by 10% within the above range, the sea component can feasibly melt during production process of a molded body comprising the flat sea-island composite fibers, so that the island component can be independently dispersed in the mixture containing the flat sea-island composite fibers and the matrix material. The range may be more preferably 400 seconds or shorter, further preferably 300 seconds or shorter, and still further preferably 200 seconds or shorter.

Production of Flat Sea-Island Composite Fiber

The flat sea-island composite fiber can be produced by a known method using a known spinning-drawing device. For example, pellets of an island component polymer and pellets of a sea component polymer may be fed to separate melt extruders and be molten to give melts. The respective melts may be combined within a composite spinneret designed to form a desired fiber cross section and be discharged through a nozzle at the above ratio, i.e., (island component)/(sea component). As-spun fibers may be typically wound at 500 to 4000 in/min. The number of island component parts (or the number of islands) can be changed by selecting a spinneret, and the composite fiber may include 1 to 1000 islands, preferably 2 to 600 islands, and more preferably 4 to 200 islands in terms of dispersibility of the island component. The wound fibers may be further drawn (by dry-heat drawing or wet-heat drawing) as needed.

Cross-Sectional Shape of Flat Sea-Island Composite Fiber

FIG. 1 is a schematic cross-sectional view showing an example of a cross-sectional shape of a flat sea-island composite fiber used in the present invention in an orthogonal direction to a fiber axis. In this example, the flat sea-island composite fiber has an island component A as 16 flat-shaped parts uniformly arranged in a sea component B over the entire fiber. It is important that the flat sea-island composite fiber as a single fiber has a flat shape in its cross section orthogonal to a longitudinal direction of the fiber, or in other words, has a substantially elliptical shape that is more elongated in one direction as compared with a true circle and has an aspect ratio, which is a ratio of a major axis to a minor axis (major axis/minor axis), of from 2.0 to 5.0, more preferably from 2.5 to 4.0, and further preferably from 2.6 to 3.4. The major axis and the minor axis in the present invention correspond to the major axis and the minor axis of the flat cross-sectional shape as shown in FIG. 1, respectively. The major axis is defined as a longest line segment passing through the center of gravity in the flat cross-sectional shape of the single fiber. The minor axis is defined as a longest line segment in a direction orthogonal to the major axis.

The flat sea-island composite fibers make it possible to effectively dissipate heat (transfer heat) when mixed with the matrix material to be melt-molded, as compared with fibers having a same single fiber fineness but having the aspect ratio of 1, so that heat can be sufficiently dissipated to the flat sea-island composite fibers (in particular, to the sea component thereof). As a result, the island component parts can be uniformly dispersed in the mixed fluid formed from the flat sea-island composite fibers and the matrix material. In other words, since each of the flat sea-island composite fibers has a larger surface area than that in a case of the fiber having a true-circle cross section (i.e., an aspect ratio of 1), the flat fibers can more easily absorb heat applied from the outside of the outer peripheral surfaces of the fibers, which facilitates melting of the sea component in the mixture containing the flat sea-island composite fibers and the matrix material. Consequently, in the mixed fluid obtained from the flat sea-island composite fibers and the matrix material, the sea component releases the internal island component so as to allow the island component of the composite fibers to be dispersed independently, so that uneven distribution of the island component is prevented.

Fibers having a too small aspect ratio may result in poor dispersion of the island component (potentially cause uneven distribution) because of slow heat dissipation in heating the mixture of the fibers and the matrix material, whereas fibers having a too large aspect ratio may have difficulty in spinning because as-spun fibers discharged from a spinning nozzle may more likely to cause breakage on contact with the spinning nozzle.

The island component (in the form of island component part(s) or island(s)) may have an aspect ratio of, for example, 5.0 or lower, preferably 4.0 or lower, and more preferably 3.5 or lower. The aspect ratio of the island component is determined in the same manner as the aspect ratio of the composite fiber. The major axis is defined as a longest line segment passing through the center of gravity in the flat cross-sectional shape of the island component. The minor axis is defined as a longest line segment in a direction orthogonal to the major axis. There is a possibility that each island component part having a too large aspect ratio has a large surface area and thus tends to contact with other island component part(s), so that the island components are more likely to be entangled, possibly leading to poor dispersion of the island components. The aspect ratio of the island component does not have a specific lower limit, and the specific lower limit may be at least 1.

Further, in terms of uniformity of the shape of the island components to be dispersed, the aspect ratio of the island component may have a CV value of preferably 45% or lower, more preferably 35% or lower, and further preferably 25% or lower.

Figure 2:
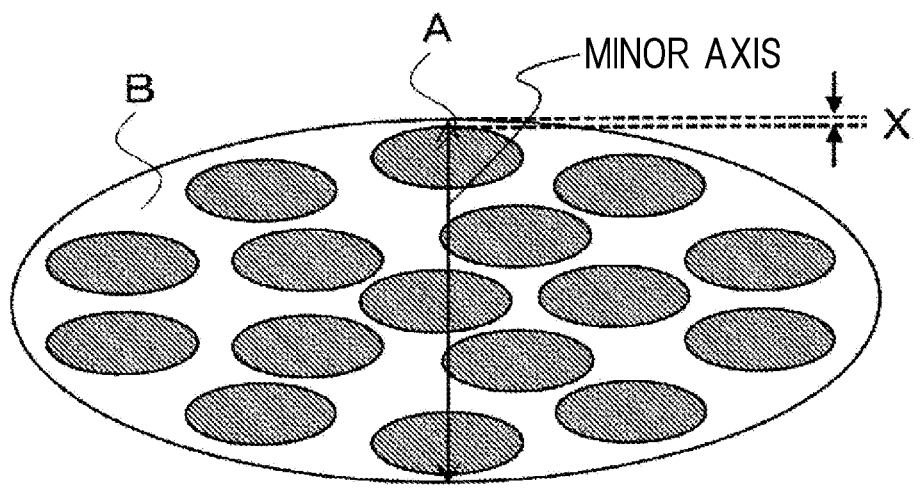
FIG. 2 is a schematic cross-sectional view of a flat sea-island composite fiber used in the present invention for illustrating a sea component thickness, the fiber being cut orthogonal to a longitudinal direction of the fiber.

It is important that in the above flat sea-island composite fiber, the sea component has a sea component thickness of from 0.2 to 2.0 μm, and preferably from 0.5 to 1.0 μm, the sea component thickness being a shortest distance (X) between an outer periphery of the fiber and an island component closest to the outer periphery on the minor axis of the cross section shown in FIG. 2. As used herein, the major axis is defined as a longest line segment of a center-of-gravity line passing through the center of gravity in the cross-sectional shape of the fiber, and the minor axis is defined as a longest line segment in a direction orthogonal to the major axis. Where the sea component thickness is too small, the island component which should be covered by the sea component is more likely to contact with the spinning nozzle, so that the fibers may feasibly bend, resulting in insufficient spinnability. Where the sea component thickness is too large, heat dissipation is delayed in heating the mixture of the fibers and the matrix material.

Single Fiber Fineness

The single fiber fineness of the flat sea-island composite fiber used in the present invention may be suitably set as appropriate and may be typically 50 dtex or lower, preferably 20 dtex or lower, and further preferably 15 dtex or lower. Where the fineness is too large, heat dissipation is delayed in heating the mixture of the fibers and the matrix material. The single fiber fineness does not have a specific lower limit and may be typically 0.01 dtex or higher, and preferably 4 dtex or higher. The single fiber fineness is measured in accordance with JIS L 1013:2010 8.3.1, method A.

Flat Sea-Island Composite Cut Fiber

Since the flat sea-island composite fibers are mixed with a matrix material, the fibers may be processed into cut fibers each having a small fiber length to give flat sea-island composite cut fibers according to the present invention. Such a flat sea-island composite cut fiber may preferably have a fiber length of from 0.5 to 30 mm, more preferably from 1.0 to 20 mm, further preferably from 1.5 to 10 mm, and more preferably from 2.7 to 3.3 mm. Fibers with a too large fiber length may make it difficult to be dispersed in the matrix material. Fibers with a too small fiber length may have difficulty in cutting in a technical sense as well as increase the production cost.

Matrix Material

The matrix material for forming a molded body used in the present invention is not limited to a specific one. Examples of such a material may include: polyolefinic resins such as polyethylene resins (a low-density polyethylene (LDPE), a medium-density polyethylene (MDPE), a high-density polyethylene (HDPE), a linear-chain low-density polyethylene (L-LDPE)), an ethylene-α-olefin copolymer, a polypropylene, a propylene-ethylene random copolymer, a propylene-ethylene block copolymer, a propylene-ethylene-1-butene random copolymer, a propylene-4-methyl-1-penten random copolymer, and a polybutene; thermoplastic polyvinyl alcohol resins such as an ethylene-vinyl alcohol copolymer; vinyl resins such as a polyvinyl chloride and an ethylene-vinyl acetate copolymer, acrylic resins such as a methacrylic resin, an ethylene-acrylic acid ester copolymer; thermoplastic elastomers such as a polyurethane elastomer; rubbers such as a polyisoprene, a polybutadiene, a styrene-butadiene rubber, an ethylene-propylene-diene rubber, and an acrylic rubber. Of these, where a polyolefinic resin is used as the sea component, preferred ones in terms of dispersibility may include thermoplastic elastomers such as a polyurethane elastomer, and rubbers such as a polyisoprene, a polybutadiene, a styrene-butadiene rubber, an ethylene-propylene-diene rubber, and an acrylic rubber.

Production of Molded Body

The flat sea-island composite fibers are mixed with the matrix material in a particulate form or mixed with the matrix material while the matrix material is softened to give a mixture. Then, the mixture is molded to a desired molded body by the conventional molding method, such as extrusion molding and injection molding. The matrix material is molded at a temperature equal to or higher than the melting point of the sea component and lower than the melting point of the island component. The molded body contains the flat sea-island composite fibers in at least a part thereof. In other words, the molded body contains the matrix material and the island component of the flat sea-island composite fibers in at least a part thereof. The sea component may be molten by heating to be integrated with the matrix material.

Addition of Composite Fibers to Molded Body

The molded body contains the composite fibers added at a proportion of preferably from 0.1 to 20 wt %, more preferably from 0.2 to 10 wt %, and further preferably from 0.5 to 5 wt %. Where addition of the fibers is insufficient, the molded body may not sufficiently exhibit the effects derived from inclusion of the flat sea-island composite fibers, such as high tenacity, heat-insulating properties, and lightweight. Where addition of the fibers is excessive, the molded body may have insufficient performance as a molded item, such as brittleness and poor moldability.

EXAMPLES

Hereinafter, the present invention will be more specifically described with reference to Examples. However, these Examples are not to be construed as limiting the scope of the present invention whatsoever. Composite fibers were produced, measured and evaluated in terms of various aspects in the following manner.

Examples 1 to 8

(1) Production of Flat Sea-Island Composite Fibers

An ethylene-vinyl alcohol copolymer (EVOH; available from Kuraray Co., Ltd.; ethylene content: 44 mol %, saponification degree: 99%, melting point: 165° C.) and a polyethylene (HDPE; melting point: 125° C., thermal conductivity: 11 to 12.4 ($10^{-4}$ cal/sec·cm/° C.·cm)) were fed into melt extruders to give respective melts. The melts were discharged from a flat sea-island composite spinning nozzle (having a flat shape in a single-hole cross section of the spinning nozzle) to spin fibers that contained the EVOH as an island component and the HDPE as a sea component (at a spinning temperature of 260° C.). The design of the spinning nozzle was changed for each of the Examples so as to produce flat sea-island composite fibers with number of islands, composite ratio, single fiber fineness, aspect ratio in cross section, aspect ratio of island component in cross section and CV value thereof, and sea component thickness as indicated in Table 1.

(2) Measurement of Melting Point

A inching point of the obtained fibers of each sample (sample amount: 3 to 8 mg) was measured using a differential thermogravimetric analyzer "Thermo plus TG 8120" manufactured by Rigaku Corporation, at a temperature elevation rate of 5° C./min in a measurable temperature range of from 35 to 200° C.

(3) Measurement of Aspect Ratios

The obtained fibers of each sample were cut using a rotary cutter, and fiber cross sections of the cut fibers were observed in an enlarged manner using an optical microscope. Using a measurement function of the optical microscope, each of 10 fibers were measured as to a major axis and a minor axis of the fiber to calculate a ratio of the major axis to the minor axis (i.e., major axis/minor axis) as aspect ratio. An average of aspect ratios of 10 fibers was adopted. As for aspect ratio of island component parts, one of the above fiber cross sections was randomly selected, and all island component parts within the fiber at that fiber cross section were measured to calculate an average of the measurements. It should be noted that if there are 200 or fewer island component parts in the selected fiber, all the island component parts may be measured, and if there are more than 200 island component parts in the selected fiber, randomly selected 200 island component parts may be measured.

(4) Measurement of Sea Component Thickness

The obtained fibers of each sample were directly cut using a rotary cutter. A fiber cross section of each cut fiber was observed using an electron microscope ("JCM-6000Plus" manufactured by JEOL Ltd.) to determine a distance from an outer periphery of the sea-island composite fiber at the cut section to a closest island component to the fiber periphery on the minor axis. Measurements were taken at 5 cut points to calculate an average of the measurements.

(5) Evaluation of Spinnability

Spinnability was evaluated in accordance with the following criteria:
Excellent: less than 1 time of fiber breakage per hour during continuous spinning over 1 hour;
Good: 1 to less than 3 times of fiber breakage per hour during continuous spinning over 1 hour; and
Poor: 3 or more times of fiber breakage per hour during continuous spinning over 1 hour.
Table 1 shows the results.

(6) Evaluation of Thermoplastic Deformation

A bundle of 500 filaments having a length of 10 cm was prepared as a sample from the obtained fibers of each of Examples and Comparative Examples. The sample was suspended in such a way that an end of the sample was held by a jig, and a weight (0.14 mg/dtex) was attached to the other end of the sample. Then, the sample was fixed on a scaled board. In this state, the sample was placed in a dryer set to 160° C. to observe shrinkage of the sea-island composite fibers in the longitudinal direction from a front side of the dryer. The time required for the fiber length to shrink by 1 cm (10%) was measured. Table 1 shows the results.

(7) Evaluation of Variation in Elastic Moduli of Molded Bodies

Composite fibers obtained in each of Examples and Comparative Examples were cut to a fiber length of 3 mm. The cut fibers and the same HDPE resin as that used as the sea component of the composite fibers were blended with agitation at a mass ratio of 98:2 to give a mixture. The mixture was heated at 160° C. to mold 5 sample pieces of resin molded bodies each having a size of 50 mm by 50 mm by 3 mm. An elastic modulus of each resin molded body was measured using a precision universal tester "AG-5000B" manufactured by Shimadzu Corporation. Variation in elastic moduli measured for the 5 sample pieces was calculated as an CV value, and the variation in elastic moduli was evaluated in accordance with the following criteria:

Excellent: the elastic moduli had a CV value less than 10%;
Good: the elastic moduli had a CV value equal to or greater than 10% and less than 15%; and
Poor: the elastic moduli had a CV value equal to or greater than 15%.

Comparative Example 1

The same ethylene-vinyl alcohol copolymer and polyethylene as those of Example 1 were used as an island component and a sea component, respectively. Melts of the ethylene-vinyl alcohol copolymer and polyethylene were discharged from a sea-island composite spinning nozzle (having a round shape in a single-hole cross section of the spinning nozzle) to obtain sea-island composite fibers shown in Table 1.

Comparative Example 2

The same ethylene-vinyl alcohol copolymer and polyethylene as those of Example 1 were used as an island component and a sea component, respectively. Sea-island composite fibers were spun using a nozzle designed for spinning fibers each having an aspect ratio in cross section of 1.5 and a sea component thickness of 0.8 μm as shown in Table 1.

Comparative Example 3

The same ethylene-vinyl alcohol copolymer and polyethylene as those of Example 1 were used as an island component and a sea component, respectively. Spinning was carried out using a nozzle designed for spinning fibers each having an aspect ratio in cross section of 6.0 and a sea component thickness of 0.5 μm as shown in Table 1. However, sea-island composite fibers could not be obtained.

Comparative Example 4

The same ethylene-vinyl alcohol copolymer and polyethylene as those of Example 1 were used as an island component and a sea component, respectively. Spinning was carried out using a nozzle designed for spinning fibers each having an aspect ratio in cross section of 3.0 and a sea component thickness of 0.1 μm as shown in Table 1. However, sea-island composite fibers could not be obtained.

Comparative Example 5

The same ethylene-vinyl alcohol copolymer and polyethylene as those of Example 1 were used as an island component and a sea component, respectively. Sea-island composite fibers were spun using a nozzle designed for spinning fibers each having an aspect ratio in cross section of 3.0 and a sea component thickness of 3.0 μm as shown in Table 1.

TABLE 1

| | Island component | | | Sea component | | Composite | Single | Aspect | Aspect ratio of |
|---|---|---|---|---|---|---|---|---|---|
| | Resin | Melting point (° C.) | Number of Islands | Resin | Melting point (° C.) | Ratio (weight ratio) Island/Sea | fiber fineness (dtex) | ratio in cross section (major/minor) | island component (major/minor) |
| Ex. 1 | EVOH | 165 | 16 | HDPE | 125 | 60/40 | 5 | 3.0 | 3.2 |
| Ex. 2 | EVOH | 165 | 16 | HDPE | 125 | 60/40 | 5 | 2.0 | 2.3 |
| Ex. 3 | EVOH | 165 | 16 | HDPE | 125 | 60/40 | 5 | 4.0 | 3.5 |
| Ex. 4 | EVOH | 165 | 16 | HDPE | 125 | 60/40 | 5 | 5.0 | 4.2 |
| Ex. 5 | EVOH | 165 | 16 | HDPE | 125 | 60/40 | 5 | 3.0 | 3.4 |
| Ex. 6 | EVOH | 165 | 16 | HDPE | 125 | 60/40 | 5 | 3.0 | 2.9 |
| Ex. 7 | EVOH | 165 | 16 | HDPE | 125 | 60/40 | 10 | 3.0 | 3.4 |
| Ex. 8 | EVOH | 165 | 16 | HDPE | 125 | 60/40 | 20 | 3.0 | 3.2 |
| Com. Ex. 1 | EVOH | 165 | 16 | HDPE | 125 | 60/40 | 5 | 1.0 | 1.3 |
| Com. Ex. 2 | EVOH | 165 | 16 | HDPE | 125 | 60/40 | 5 | 1.5 | 1.9 |
| Com. Ex. 3 | EVOH | 165 | 16 | HDPE | 125 | 60/40 | 5 | 6.0 | — |
| Com. Ex. 4 | EVOH | 165 | 16 | HDPE | 125 | 60/40 | 5 | 3.0 | — |
| Com. Ex. 5 | EVOH | 165 | 16 | HDPE | 125 | 60/40 | 5 | 3.0 | 2.6 |

| | CV value of aspect ratio of island component (%) | Sea component thickness (μm) | Spinnability | Thermoplastic deformation (sec) | Variation in elastic moduli of molded bodies |
|---|---|---|---|---|---|
| Ex. 1 | 20 | 0.6 | Excellent | 224 | Excellent |
| Ex. 2 | 18 | 0.6 | Excellent | 280 | Excellent |
| Ex. 3 | 34 | 0.7 | Excellent | 131 | Excellent |
| Ex. 4 | 42 | 0.6 | Excellent | 123 | Excellent |
| Ex. 5 | 26 | 0.3 | Good | 205 | Excellent |
| Ex. 6 | 15 | 1.5 | Excellent | 362 | Good |
| Ex. 7 | 20 | 0.8 | Excellent | 315 | Good |
| Ex. 8 | 21 | 0.6 | Excellent | 433 | Good |
| Com. Ex. 1 | 10 | — | Excellent | ≥600 | Poor |
| Com. Ex. 2 | 13 | 0.8 | Excellent | ≥600 | Poor |
| Com. Ex. 3 | — | 0.5 | Poor | — | — |

TABLE 1-continued

| | | | | | |
|---|---|---|---|---|---|
| Com. Ex. 4 | — | 0.1 | Poor | — | — |
| Com. Ex. 5 | 15 | 3.0 | Excellent | ≥600 | Poor |

In each of Examples 1 to 8, the flat sea-island composite fiber comprises an island component and a sea component having a lower melting point than that of the island component, the fiber having an aspect ratio (major axis/minor axis) of from 2.0 to 5.0 in a fiber cross section and a sea component thickness of from 0.2 to 2.0 µm in the fiber cross section, and thus the fibers in Examples 1 to 8 show excellent spinnability and thermoplastic deformability. Therefore, it is presumed that use of the sea-island composite fibers of Examples 1 to 8 enable to produce molded bodies in which independent dispersion of the island components can be facilitated in the matrix material containing the flat sea-island composite fibers. In fact, owing to the dispersibility of the island components, the molded bodies of Examples 1 to 8 had a smaller variation in elastic moduli than that of the molded bodies of Comparative Examples 1 to 2 and 5.

Comparative Example 1 having an aspect ratio of 1.0 in a fiber cross section (circle cross section) deteriorated in heat dissipation over the entire fiber, resulting in poor thermoplastic deformability, and a large variation in elastic moduli of the molded bodies as with the features shown in conventional fibers. Comparative Example 2 had an aspect ratio of 1.5 in a fiber cross section and thus was not sufficiently flat as with Comparative Example 1, resulting in slow heat dissipation over the entire fiber, poor thermoplastic deformability, and an unfavorable variation in elastic moduli of the molded bodies. In particular, Comparative Examples 1 and 2 had inferior thermoplastic deformability to Examples 7 and 8 despite that Comparative Examples 1 and 2 had smaller fineness than Examples 7 and 8.

Comparative Example 3, on the other hand, had an aspect ratio of 6.0 in a fiber cross section and thus was very flat. Therefore, frequent fiber breakage occurred, so that it was not possible to obtain fibers. The reason of the fiber breakage is presumed to be the contact between the spinning nozzle and the island components of as-spun fibers discharged from the spinning nozzle. Comparative Example 4 had a sea component thickness of 0.1 µm and was even thinner than that of Example 5, so that Comparative Example 4 had reduced spinnability and had difficulty in continuous winding. Comparative Example 5 had a sea component thickness of 3.0 µm and was even thicker than Example 6, so that Comparative Example 5 had good spinnability, but had poor thermoplastic deformability and a large variation in elastic moduli of the molded bodies.

Comparative Examples 1 to 2 and 5 had poor thermoplastic deformability and large variations in elastic moduli of the molded bodies. Therefore, it is presumed that use of the sea-island composite fibers of Comparative Examples 1 to 2 and 5 for producing a molded body results in uneven distribution in the molded body because the island component parts in the sea-island composite fibers are restricted by the sea component.

INDUSTRIAL APPLICABILITY

The sea-island composite fibers according to the present invention have excellent thermoplastic deformability in melt-processing a mixture of the fibers and a matrix material, so that it is expected that an obtained molded body contains the island component parts dispersed without unevenness and sufficiently exhibits the characteristics of the incorporated composite fibers (such as hydrophilicity, high tenacity, heat insulating property, lightweight, weather resistance, and electrical insulating property). Such a resin molded body can be suitably used for applications which require the above characteristics, such as building materials, automobile components, medical devices, and shock absorbers.

Although the present invention has been described in terms of the preferred embodiments as examples, those skilled in the art can understand that various changes, additions and substitutions can be made without departing from the scope of the invention disclosed in the claims.

REFERENCE NUMERALS

A island component
B sea component
X sea component thickness

What is claimed is:

1. A sea-island composite fiber comprising an island component and a sea component having a lower melting point than that of the island component, wherein
the sea-island composite fiber has an aspect ratio of from 2.0 to 5.0 in a fiber cross section; and
the sea component has a sea component thickness of from 0.2 to 2.0 µm, the sea component thickness being defined as a distance between an outer periphery of the sea-island composite fiber and an island component closest to the outer periphery on a minor axis of the fiber cross section.

2. The sea-island composite fiber according to claim 1, wherein the island component contains an ethylene-vinyl alcohol copolymer.

3. The sea-island composite fiber according to claim 1, wherein the sea component contains a polyolefinic resin.

4. The sea-island composite fiber according to claim 2, wherein the sea component contains a polyolefinic resin.

5. The sea-island composite fiber according to claim 1, wherein the sea-island composite fiber has a single fiber fineness of 50 dtex or lower.

6. The sea-island composite fiber according to claim 1, wherein the island component has an aspect ratio of 5.0 or lower.

7. The sea-island composite fiber according to claim 1, wherein the sea-island composite fiber has a fiber length of from 0.5 to 30 mm.

8. The sea-island composite fiber according to claim 1, wherein the sea-island composite fiber comprises an oiling agent applied in a proportion of from 0.1 to 30 wt % based on a fiber weight.

9. The sea-island composite fiber according to claim 1, wherein the sea-island composite fiber has a shrinkage property for shrinking by 10% in fiber length in a longitudinal direction of the sea-island composite fiber in 500 seconds or shorter when the sea-island composite fiber is heated at 160° C. with a weight of 0.14 mg/dtex attached to an end of the sea-island composite fiber.

10. A molded body comprising, at least in part of the molded body, the sea-island composite fiber as recited in claim 1.

11. A method of producing a molded body, the method comprising:
 mixing a matrix material and the sea-island composite fiber as recited in claim 1 to give a mixture, and
 heating the mixture at a temperature equal to or higher than a melting point of the sea component and lower than a melting point of the island component of the sea-island composite fiber to mold the mixture into shape.

\* \* \* \* \*